(12) United States Patent
Gan et al.

(10) Patent No.: US 11,841,594 B2
(45) Date of Patent: Dec. 12, 2023

(54) DISPLAY PANEL, PREPARING METHOD, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Quan Gan, Beijing (CN); Mingfei Zhang, Beijing (CN); Yongcan Wang, Beijing (CN); Fengzhen Lv, Beijing (CN); Xianjie Shao, Beijing (CN); Rui Ma, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 159 days.

(21) Appl. No.: 17/421,490

(22) PCT Filed: Sep. 29, 2020

(86) PCT No.: PCT/CN2020/119089
§ 371 (c)(1),
(2) Date: Jul. 8, 2021

(87) PCT Pub. No.: WO2022/067582
PCT Pub. Date: Apr. 7, 2022

(65) Prior Publication Data
US 2022/0342265 A1 Oct. 27, 2022

(51) Int. Cl.
*G02F 1/1362* (2006.01)
*G02F 1/1339* (2006.01)

(52) U.S. Cl.
CPC .... *G02F 1/136222* (2021.01); *G02F 1/13394* (2013.01); *G02F 1/13398* (2021.01); *G02F 1/136209* (2013.01)

(58) Field of Classification Search
None
See application file for complete search history.

(56) References Cited

U.S. PATENT DOCUMENTS

| | | | |
|---|---|---|---|
| 2002/0080320 A1* | 6/2002 | Suzuki | G02F 1/134336 349/153 |
| 2017/0115525 A1* | 4/2017 | Okita | G02F 1/133345 |
| 2021/0364841 A1* | 11/2021 | Shao | G02F 1/13394 |

FOREIGN PATENT DOCUMENTS

| CN | 1530706 A | 9/2004 |
|---|---|---|
| CN | 103744222 A | 4/2014 |

(Continued)

*Primary Examiner* — Richard H Kim
(74) *Attorney, Agent, or Firm* — ArentFox Schiff LLP; Michael Fainberg

(57) ABSTRACT

Embodiments of the present disclosure provide a display panel, a preparing method, and a display device. The display panel includes: a color film substrate and an array substrate opposite to the color film substrate. The color film substrate includes: an opposite substrate, a color resistance layer on the opposite substrate and a plurality of support structures on a side, away from the opposite substrate, of the color resistance layer at intervals. The array substrate includes: a base substrate and a plurality of auxiliary structures on a side, facing the opposite substrate, of the base substrate at intervals. At least one auxiliary structure of the plurality of auxiliary structures correspondingly contacts with at least one support structure of the plurality of support structures.

11 Claims, 5 Drawing Sheets

(56) References Cited

FOREIGN PATENT DOCUMENTS

| | | |
|---|---|---|
| CN | 203720502 U | 7/2014 |
| CN | 105676544 A | 6/2016 |
| CN | 107728389 A | 2/2018 |
| CN | 111176023 A | 5/2020 |
| JP | 2001183513 A | 7/2001 |

* cited by examiner

DISPLAY PANEL, PREPARING METHOD, AND DISPLAY DEVICE

The present disclosure is a National Stage of International Application No. PCT/CN2020/119089, filed on Sep. 29, 2020, the content of which is incorporated herein by reference in its entirety.

FIELD

The present disclosure relates to the technical field of display, in particular to a display panel, a preparing method, and a display device.

BACKGROUND

A Liquid Crystal Display (LCD), which is generally formed by a color film substrate and an array substrate through alignment, with a layer of liquid crystal molecules sandwiched between the color film substrate and the array substrate, generally requires a support spacer to be disposed in order to ensure uniformity of the thickness of the layer of liquid crystal molecules.

SUMMARY

An embodiment of the present disclosure provides a display panel, including:
a color film substrate; and
an array substrate opposite to the color film substrate;
the color film substrate including:
an opposite substrate;
a color resistance layer on the opposite substrate; and
a plurality of support structures on a side, away from the opposite substrate, of the color resistance layer at intervals; and
the array substrate including:
a base substrate; and
a plurality of auxiliary structures on a side, facing the opposite substrate, of the base substrate at intervals; wherein at least one auxiliary structure of the plurality of auxiliary structures correspondingly contacts with at least one support structure of the plurality of support structures;
wherein each of the plurality of support structures includes: at least two support layers stacked, the at least two support layers include a flat layer away from a side of the opposite substrate, the flat layer covers remaining support layers of the at least two support layers, and a slope angle of the flat layer in the support structure is greater than slope angles of the remaining support layers.

In some examples, an orthographic projection of the flat layer onto the opposite substrate covers the opposite substrate.

In some examples, a material of the flat layer is a resin material.

In some examples, the color resistance layer includes color resistance structures of multiple colors; and a material of at least one of the remaining support layers is the same as a material of a color resistance structure of one color.

In some examples, at least one support layer of the remaining support layers is formed by using a same patterning process with the color resistance structure of one color of the color resistance structures of multiple colors.

In some examples, a quantity of layers in the remaining support layers is less than or equal to a quantity of colors of the color resistance structures of multiple colors.

In some examples, the color resistance structures include a red color resistance structure, a green color resistance structure, and a blue color resistance structure; and the remaining support layers include a support layer of the same material as the red color resistance structure, a support layer of the same material as the green color resistance structure, and a support layer of the same material as the blue color resistance structure.

In some examples, the color film substrate further includes: a black matrix layer between the opposite substrate and the color resistance layer; and an orthographic projection of the black matrix layer onto the opposite substrate covers an orthographic projection of the plurality of support structures onto the opposite substrate.

In some examples, an orthogonal projection of the at least one auxiliary structure is intersected with an orthogonal projection of the at least one support structure correspondingly contacting with the at least one auxiliary structures onto the base substrate.

An embodiment of the present disclosure provides a display device including the above-described display panel.

An embodiment of the present disclosure provides a preparing method for a display panel, including:
forming the color resistance layer and the plurality of support structures on the opposite substrate, wherein each of the plurality of support structures includes: the at least two support layers stacked, the at least two support layers include the flat layer away from the side of the opposite substrate, the flat layer covers remaining support layers in the support structure, and the slope angle of the flat layer in the support structure is greater than the slope angles of the remaining support layers;
forming the plurality of auxiliary structures on the base substrate, wherein the at least one auxiliary structure of the plurality of auxiliary structures corresponds to the at least one support structure of the plurality of support structures; and
performing alignment on the opposite substrate with the color resistance layer and the plurality of support structures and the base substrate with the plurality of auxiliary structures, such that the at least one auxiliary structure of the plurality of auxiliary structures correspondingly contacts with the at least one support structure of the plurality of support structures.

In some examples, the forming the color resistance layer and the plurality of support structures on the opposite substrate specifically includes:
sequentially forming patterns of color resistance structures of multiple colors on the opposite substrate;
forming the remaining support layers on a side, away from the opposite substrate, the color resistance structures; and
forming the flat layer covering the entire opposite substrate on a side, away from the opposite substrate, of the remaining support layers.

In some examples, the forming the color resistance layer and the plurality of support structures on the opposite substrate specifically includes:
sequentially forming patterns of color resistance structures of multiple colors on the opposite substrate, and meanwhile forming the remaining support layers; and
forming the flat layer covering the entire opposite substrate on a side, away from the opposite substrate, of the remaining support layers.

DETAILED DESCRIPTION OF THE EMBODIMENTS

Figure 1:
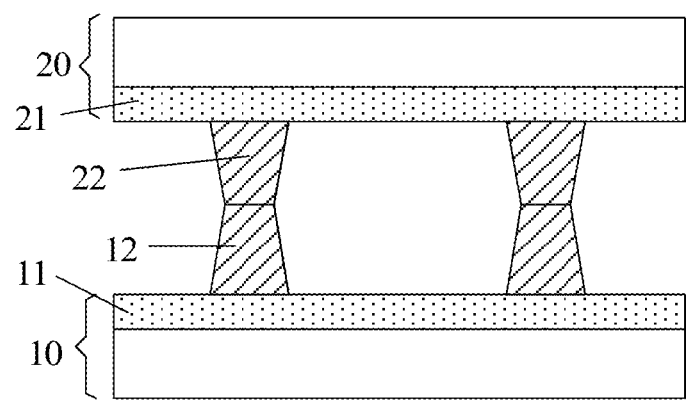
FIG. 1 is a schematic cross-sectional view of a display panel in the related art.

In order to make the objectives, technical solutions and advantages of embodiments of the present disclosure clearer, the technical solutions of the embodiments of the present disclosure will be clearly and completely described below in conjunction with drawings of the embodiments of the present disclosure. Obviously, the described embodiments are part of, but not all, embodiments of the present disclosure. The embodiments and features of the embodiments of the present disclosure may be combined with each other without conflict. Based on the described embodiments of the present disclosure, all other embodiments obtained by a person of ordinary skill in the art without inventive effort fall within the scope of protection of the present disclosure.

Unless otherwise defined, technical or scientific terms used herein are to be taken as commonly understood by one of ordinary skill in the art to which the disclosure belongs. The terms "first", "second" and the like, as used herein, do not denote any order, quantity, or importance, but are merely used to distinguish one component from another. The word "comprising" or "including" and the like means that elements or items preceding the word appear to encompass elements or items listed after the word and equivalents thereof, but not to the exclusion of other elements or items. "Connect" or "connected" and the like are not restricted to physical or mechanical connections, but may include electrical connections, whether direct or indirect.

It is noted that the sizes and shapes of the figures in the drawings do not reflect the true scale, but are merely illustrative of the contents of the present disclosure. The same or similar reference numerals throughout refer to the same or similar elements or elements having the same or similar functions.

As shown in FIG. 1, a display panel may include: an array substrate 10 and a color film substrate 20 which are oppositely arranged. The display panel may further include: a plurality of pixel units arranged in an array in a display region. Each pixel unit includes a plurality of sub-pixels. Exemplarily, a pixel unit may include a red sub-pixel, a green sub-pixel and a blue sub-pixel, which may achieve color display through red-green-blue color mixture. Alternatively, a pixel unit may also include a red sub-pixel, a green sub-pixel, a blue sub-pixel, and a white sub-pixel, which may achieve color display through red-green-blue-white color mixture. Certainly, in actual applications, the emission colors of the sub-pixels in the pixel units may be determined by design according to the actual application environment, and are not limited herein.

In some examples, as shown in FIG. 1, a liquid crystal layer is further encapsulated between the array substrate 10 and the color film substrate 20 so that a liquid crystal display function may be achieved. Exemplarily, the array substrate is provided with a base substrate, as well as transistors and thin film transistors located on the base substrate and in each sub-pixel. An alignment film 11 is further arranged on sides, away from the base substrate, of the transistors and the thin film transistors, and a plurality of first spacers 12 are arranged on a side, away from the base substrate, of the alignment film 11. The color film substrate is provided with an opposite substrate, and an alignment film 21 and a plurality of second spacers 22 are also arranged on a side, facing the base substrate, of the opposite substrate. the respective first spacers 12 are correspond to the respective second spacers 22. In this way, an alignment space of the liquid crystal layer may be supported by the correspondingly arranged first and second spacers 12 and 22.

However, in practical applications, the correspondingly arranged first and second spacers 12 and 22 are in a compressed state and be maintained in a certain compression ratio, thereby supporting the cell gap after alignment and maintaining uniformity of the cell gap. When the display panel is vigorously acted upon by an external force, relative displacement between an array substrate 0200 and a color film substrate 0100 is caused and results in misalignment, causing the first and second spacers 12 and 22 in the compressed state to detach from original standing areas and enter a display area of a sub-pixel, as well as scratch the alignment films on the opposite side. In addition, in practical applications, the segment difference of protrusions formed by the first and second spacers 12 and 22 is large, which makes the first and second spacers 12 and 22 difficult to recover after deformation displacement, which causes image quality problems of light leakage and uneven display of the display panel.

In view of this, an embodiment of the present disclosure provides a color film substrate 0100 which may effectively avoid the problem that the spacers may not be recovered after displacement by making the spacers gentle.

As shown in FIGS. 2A to 2D, the color film substrate 0100 provided by the embodiment of the present disclosure may include:
an opposite substrate 100;
a color resistance layer on the opposite substrate 100; and
a plurality of support structures 110 on a side, away from the opposite substrate 100, of the color resistance layer at intervals;
each of the support structure 110 includes: at least two support layers stacked, wherein the at least two support layers include a flat layer 111 away from a side of the opposite substrate 100, the flat layer 111 covers remaining support layers of the at least two support layers 110, and a slope angle β2 of the flat layer 111 in the support structure 110 is greater than slope angles β2 of the remaining support layers.

According to the color film substrate 0100 provided by the embodiment of the present disclosure, the support structures formed by the support layers stacked may be used as protrusions to function as the spacers. In addition, the support structures includes at least two support layers stacked, wherein the at least two support layers include the flat layer away from the side of the opposite substrate; and the flat layer covers the remaining support layers in the support structure. In this way, when preparing the flat layer, due to the fluidity of a material of the flat layer, the flat layer may be made to be with relatively larger amount of material at the corners of other support layers, therefore the slope angle of the flat layer in the support structures is greater than the slope angles of the remaining support layers, so that the support structures formed by the support layers stacked may be gentle after the flat layer covers the remaining support layers, and the problem that the support structures may not be recovered after displacement may be effectively avoided.

Figure 5A:
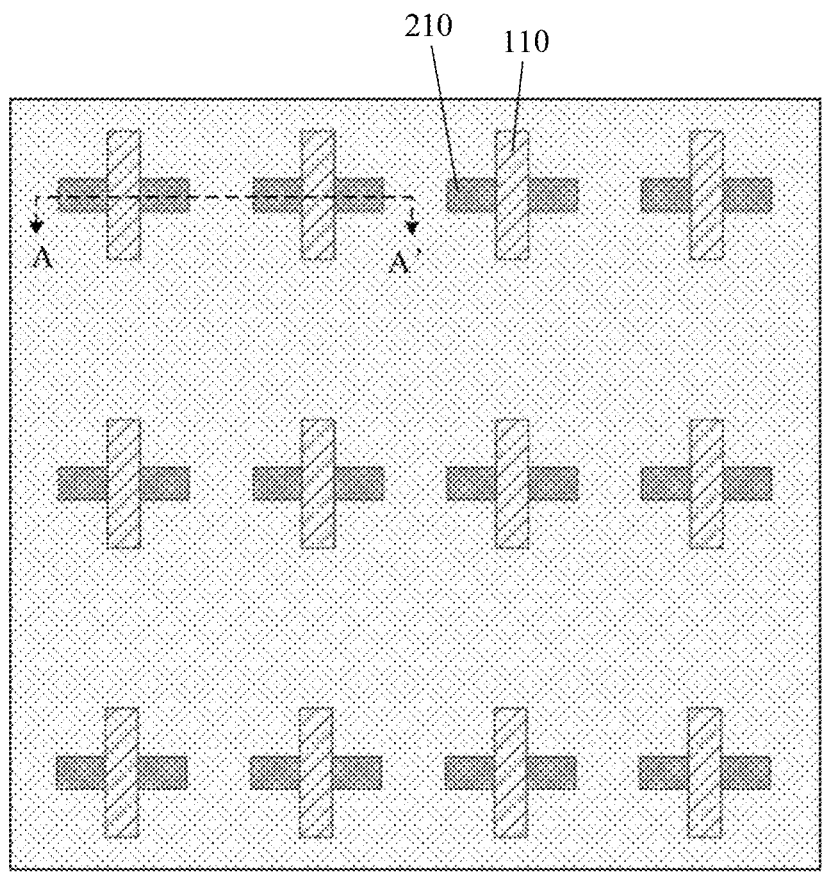
FIG. 5A is a schematic top view of a display panel provided by an embodiment of the present disclosure.
Figure 5B:
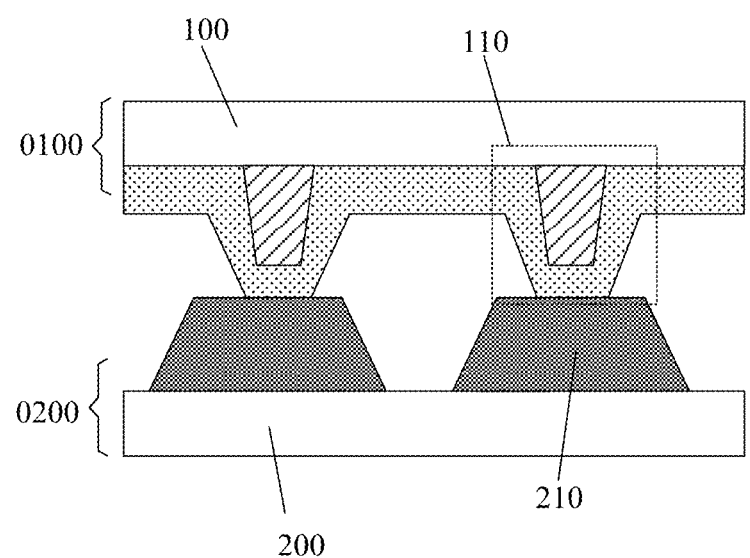
FIG. 5B is a schematic cross-sectional view of the display panel provided by the embodiment of the present disclosure shown in FIG. 5A along a direction AA'.

A display panel provided by an embodiment of the present disclosure, as shown in FIGS. 5A and 5B, may include:

a color film substrate 0100; and an array substrate 0200 opposite to the color film substrate 0100;

wherein the array substrate 0200 includes:

a base substrate 200; and a plurality of auxiliary structures 210 on a side, facing the opposite substrate 100, of the base substrate 200 at intervals;

wherein at least one auxiliary structure of the plurality of auxiliary structures 210 correspondingly contacts with at least one support structure of the plurality of support structures 110.

Exemplarily, as shown in FIGS. 5A and 5B, one auxiliary structure 210 may correspondingly contact with one support structure 110. For example, as shown in FIGS. 5A and 5B, an orthogonal projection of the auxiliary structure 210 onto the base substrate 200 is intersected with an orthogonal projection of the support structure 110 correspondingly contacting with the auxiliary structure 210 onto the base substrate 200. Optionally, in FIGS. 2A to 2D and FIGS. 5A and 5B, the orthogonal projections of the support structures 110 onto the opposite substrate 100 may be in strip shapes. The orthogonal projections of the auxiliary structures 210 onto the opposite substrate 100 may also be in strip shapes. The orthogonal projection of the auxiliary structure 210 onto the base substrate 200 and the orthogonal projection of the support structure 110 correspondingly contacting with the auxiliary structure 210 onto the base substrate 200 are in a cross shape. Certainly, in practical applications, the orthographic projection of the support structure 110 onto the opposite substrate 100 and the orthographic projection of the auxiliary structure 210 onto the opposite substrate 100 may also be in other shapes, which may be designed according to the requirements of the practical application environment, and are not limited herein.

Figure 2A:
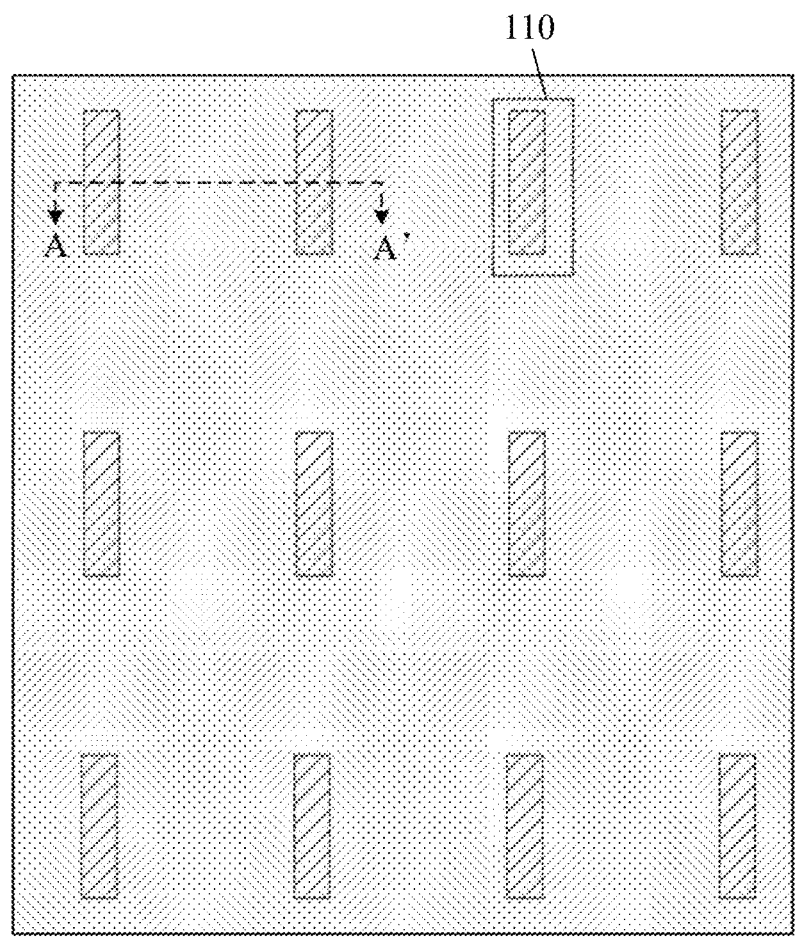
FIG. 2A is a schematic top view of a color film substrate provided by an embodiment of the present disclosure.
Figure 2B:
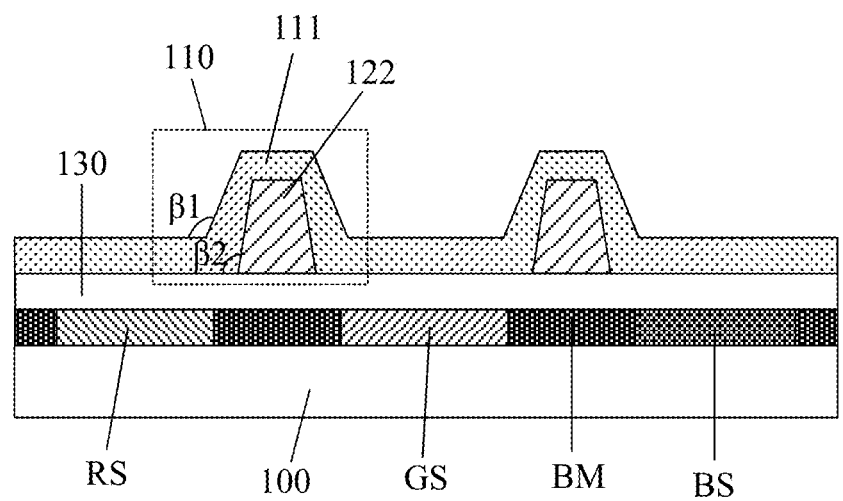
FIG. 2B is a schematic cross-sectional view of the color film substrate provided by the embodiment of the present disclosure shown in FIG. 2A along a direction AA'.
Figure 2C:
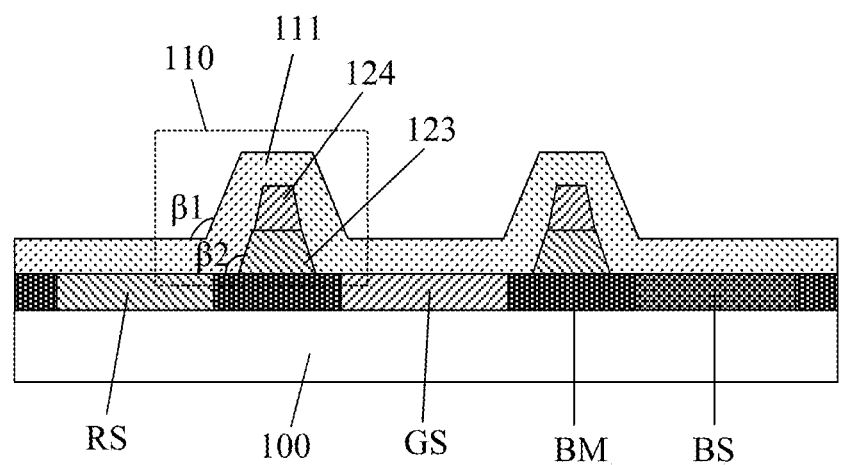
FIG. 2C is another schematic cross-sectional view of the color film substrate provided by the embodiment of the present disclosure shown in FIG. 2A along the direction AA'.
Figure 2D:
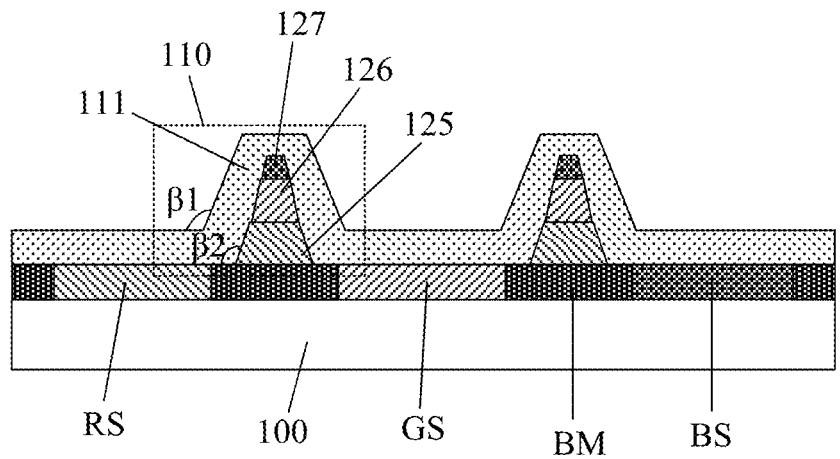
FIG. 2D is yet another schematic cross-sectional view of the color film substrate provided by the embodiment of the present disclosure shown in FIG. 2A along the direction AA'.

In some examples, the remaining support layers of the support structures 110 other than the flat layer 111 may be taken as a whole. In specific implementation, the remaining support layers may be arranged as one support layer, as shown in FIG. 2B. For example, the remaining support layers are a second support layer 122. Alternatively, the remaining support layers may also be arranged as two support layers as shown in FIG. 2C. For example, the remaining support layers are a third support layer 123 and a fourth support layer 124 stacked. Alternatively, the remaining support layers may also be arranged as three support layers as shown in FIG. 2D. For example, the remaining support layers are a fifth support layer 125, a sixth support layer 126 and a seventh support layer 127 stacked. Certainly, in practical applications, the number of layers in the support layers in the remaining support layers may be designed according to the requirements of the practical applications, and is not limited herein.

In some examples, in specific implementation, an orthographic projection of the flat layer 111 onto the opposite substrate 100 covers the opposite substrate 100, as shown in FIGS. 2A to 2D. In this way, it possible for the flat layer 111 to be laid on the opposite substrate 100 as a whole layer, and the surface of each support structure 110 is made gentle as much as possible based on the fluidity of the material of the flat layer 111. In addition, the whole film layer is laid without additional exposure and etching processes, so that the process preparation difficulty may be reduced.

In some examples, in specific implementation, the material of the flat layer 111 may be set as a resin material. Exemplarily, the resin material may include a photoresist material such as a photosensitive resin photoresist.

In some examples, in specific implementation, as shown in FIGS. 2A to 2D, the color resistance layer may include color resistance structures of multiple colors; and a material of at least one of the remaining support layers is the same as a material of a color resistance structure of one color. Further, at least one support layer of the remaining support layers is formed by using one same patterning process with the color resistance structure of one color. In this way, the remaining support layers and the color resistance structure may be formed by using one same patterning process, so that the process preparation difficulty may be reduced.

Further, the number of layers in the support layers in the remaining support layers may be less than or equal to the number of colors of the color resistance structures. Exemplarily, the color resistance structures may include color resistance structures of three colors: a red color resistance structure, a green color resistance structure, and a blue color resistance structure. The remaining support layers may be arranged as one support layer or two support layers or three support layers.

Exemplarily, as shown in FIG. 2B, the remaining support layers are one support layer, for example, the remaining support layers are the second support layer 122. The second support layer 122 may be formed by a process of preparing a spacer in the related art, and the second support layer 122 may be as a spacer. Alternatively, the material of the second support layer 122 may be the same as the material of the color resistance structure of one color. For example, the color resistance structures may include color resistance structures of three colors: a red color resistance structure, a green color resistance structure, and a blue color resistance structure. The material of the second support layer 122 may be the same as the material of one of the red color resistance structure, the green color resistance structure, and the blue color resistance structure. The material of the second support layer 122 may be the same as the material of the red color resistance structure, as shown in FIG. 2B.

Exemplarily, as shown in FIG. 2C, the remaining support layers are two support layers. For example, the remaining support layers are the third support layer 123 and the fourth support layer 124, wherein the material of the third support layer 123 may be the same material as the color resistance structure of one color, and the material of the fourth support layer 124 may be the same material as the color resistance structure of another color. For example, the color resistance structures may include color resistance structures of three colors: a red color resistance structure, a green color resistance structure, and a blue color resistance structure. The material of the third support layer 123 may be the same as the material of the red color resistance structure, and the material of the fourth support layer 124 may be the same as the material of the green color resistance structure. Certainly, the material of the third support layer 123 and the material of the fourth support layer 124 may also be selected from the red color resistance structure, the green color resistance structure, and the blue color resistance structure, which may be designed according to the requirements of the actual application environment, and are not limited herein.

Exemplarily, as shown in FIG. 2D, the remaining support layers are three support layers. For example, the remaining support layers are the fifth support layer 125, the sixth support layer 126 and the seventh support layer 127. For example, the color resistance structures may include a red color resistance structure, a green color resistance structure, and a blue color resistance structure. The material of the fifth support layer 125 may be the same as the material of the red color resistance structure, the material of the sixth support layer 126 may be the same as the material of the green color resistance structure, and the material of the seventh support layer 127 may be the same as the material of the blue color resistance structures. Certainly, the materials of the fifth support layer 125, the sixth support layer 126 and the seventh support layer 127 may also be selected from the red color resistance structure, the green color resistance structure and the blue color resistance structure, which may be designed according to the requirements of the actual application environment, and are not limited herein.

In some examples, in specific implementation, the color film substrate 0100 may further include: a black matrix layer BM between the opposite substrate 100 and the color resistance layer, as shown in FIGS. 2A to 2D. An orthographic projection of the black matrix layer BM onto the opposite substrate 100 covers an orthographic projection of the support structures 110 onto the opposite substrate 100. In this way, the support structures 110 may be shielded with the black matrix layer BM.

In some examples, in specific implementation, the orthographic projection of the black matrix layer BM onto the opposite substrate 100 covers an orthographic projection of the auxiliary structures 210 onto the opposite substrate 100. In this way the auxiliary structures 210 may also be covered by the black matrix layer BM.

In practical applications, as shown in FIGS. 5A and 5B, the correspondingly arranged auxiliary structures 210 and support structures 110 are in a compressed state and be maintained in a certain compression ratio, thereby supporting the cell gap after alignment and maintaining uniformity of the cell gap. When the display panel is vigorously acted upon by an external force, relative displacement between the array substrate 0200 and the color film substrate 0100 is caused and results in misalignment, causing the auxiliary structures 210 and the support structures 110 in the compressed state to detach from the original standing areas and enter the display area of the sub-pixel. In the support structures 110 in the embodiment of the present disclosure, the flat layer 111 covers the remaining support layers in the support structures 110. In preparing the flat layer 111, due to the fluidity of the material of the flat layer 111, the flat layer 111 may be made to be with relatively larger amount of material at the corners of other support layers, and therefore the slope angle of the flat layer 111 is greater than the slope angles of the remaining support layers, so that the support structures 110 may be gentle as a whole after the flat layer 111 covers the remaining support layers, such that when the auxiliary structures 210 are influenced by an external force to disengage from the support structures 110 from the original standing areas into the display area of the sub-pixel, after the external force is removed, the original standing areas of the auxiliary structures 210 and the support structures 110 may be recovered, the problem that the support structures may not be recovered after displacement may be effectively avoided, and the image quality problems of light leakage and uneven display of the display panel may be relieved.

In addition, a related test was also performed on the display panel shown in FIG. 1 and the display panel formed by the color film substrate 0100 shown in FIG. 2D, respectively. In Table 1, optical properties (e.g., panel transmittance, picture quality, color coordinates, etc.) A1 of the two display panels, image quality uniformity parameters A2 of the two display panels in a dark state, panel strength parameters A3 of the two display panels and uneven display parameters A4 of the two display panels resulted from scratching the alignment film when the auxiliary structures 210 and the support structures 110 deviate from the original standing areas were respectively obtained by test. As can be seen in Table 1, the display panel formed by the color film substrate 0100 shown in FIG. 2D has an optical property meeting the requirement, and has a significant improvement in both image quality uniformity in the dark state and panel strength.

TABLE 1

|    | Display Panel shown in FIG. 1 | Display panel shown in FIG. 2D |
|----|-------------------------------|--------------------------------|
| A1 | Meeting requirements          | Meeting requirements           |
| A2 | 2.5                           | 1                              |
| A3 | 55                            | 80                             |
| A4 | 7                             | 7                              |

Furthermore, according to the display panel provided by the embodiment of the present disclosure, only the support structures on the color film substrate need to be designed to make a whole support structure gentle, such that when the auxiliary structures and the support structures are detached from the original standing areas and enter the display area of the sub-pixel due to the external force, after the external force is removed, the original standing areas of the auxiliary structures and the support structures may be recovered, the problem that the support structures may not be recovered after displacement may be effectively avoided, and the image quality problems of light leakage and uneven display of the display panel may be relieved.

An embodiment of the present disclosure also provides a preparing method for a display panel, which may include:
  forming a color resistance layer and a plurality of support structures on an opposite substrate, wherein the plurality of support structures includes: at least two support layers stacked, the at least two support layers include a flat layer away from a side of the opposite substrate, the flat layer covers remaining support layers in the support structures, and a slope angle of the flat layer in the support structures is greater than slope angles of the remaining support layers;
  forming a plurality of auxiliary structures on the base substrate, wherein at least one auxiliary structure of the plurality of auxiliary structures corresponds to at least one support structure of the plurality of support structures; and
  performing alignment on the opposite substrate with the color resistance layer and the plurality of support structures and the base substrate with the plurality of auxiliary structures, such that the at least one auxiliary structure of the plurality of auxiliary structures correspondingly contacts with the at least one support structure of the plurality of support structures.

The sequential order of the steps of forming the color resistance layer and the plurality of support structures on the opposite substrate and the step of forming the plurality of auxiliary structures on the base substrate may not be limited. For example, the step of forming the color resistance layer and the plurality of support structures on the opposite substrate may be before the step of forming the plurality of auxiliary structures on the base substrate, alternatively, the step of forming the plurality of auxiliary structures on the base substrate may be before the step of forming the color resistance layer and the plurality of support structures on the opposite substrate. Alternatively, the steps of forming the color resistance layer and the plurality of support structures on the opposite substrate and the step of forming the plurality of auxiliary structures on the base substrate may also be performed simultaneously.

In some examples, in specific implementation, prior to forming the color resistance layer and the plurality of support structures 110 on the opposite substrate 100, the preparing method further includes: forming a pattern of a black matrix layer BM on the opposite substrate 100.

Figure 3:
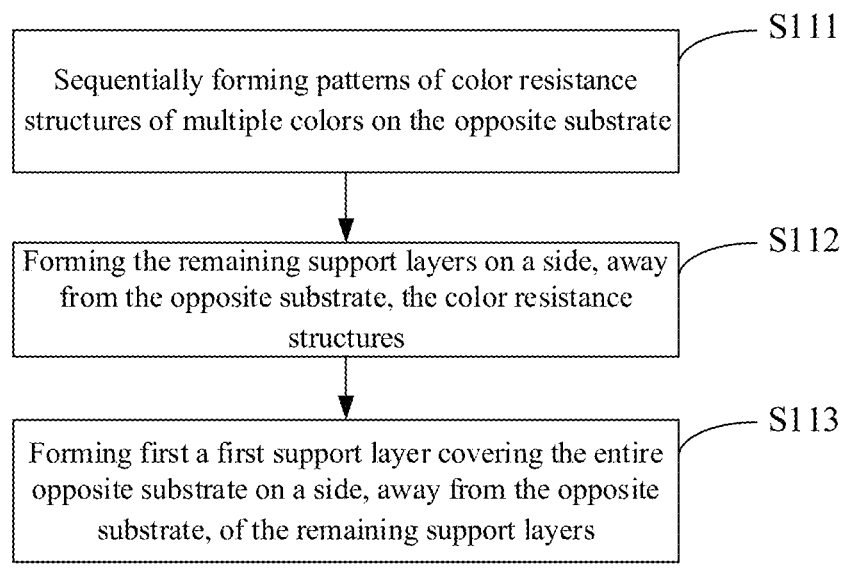
FIG. 3 is a flow chart illustrating a preparing method for a color film substrate provided by an embodiment of the present disclosure.

In some examples, in specific implementation, forming the color resistance layer and the plurality of support structures 110 on the opposite substrate 100, as shown in FIG. 3, may specifically include the following steps.

S111, forming patterns of color resistance structures of multiple colors sequentially on the opposite substrate 100.

S112, forming the remaining support layers, on a side, away from the opposite substrate 100, the color resistance structures.

S113, forming the flat layer 111 covering the entire opposite substrate 110 on a side, away from the opposite substrate 100, of the remaining support layers.

In some examples, in specific implementation, after S111: forming the patterns of the color resistance structures of multiple colors sequentially on the opposite substrate 100, and before S112: forming the remaining support layers, away from the opposite substrate 100, on the color resistance structures, the preparing method may further include: forming a leveling layer covering the entire opposite substrate 100. Exemplarily, a material of the leveling layer may include a resin material. Since the resin material has leveling characteristics (partial segment differences may be reduced), the surface of the opposite substrate 100 may be made as flat as possible. In addition, the flat layer may also prevent material pollution and improve a residual image. As shown in FIG. 2A, a leveling layer 130 is between the color resistance layer and the layer on which the support structures 110 is located.

The preparing method described above is described below in conjunction with specific embodiments, taking as examples that the color resistance structures include the red color resistance structure, the green color resistance structure and the blue color resistance structure.

Some preparing methods of the color film substrate provided by the embodiments of the present disclosure may include the following steps.

(1) A pattern of the black matrix layer BM is formed on the opposite substrate 100 by using a patterning process. An orthographic projection of the black matrix layer BM onto the opposite substrate 100 and an orthographic projection of gaps between sub-pixels onto the opposite substrate 100 have an_overlapping area, and the orthographic projection of the black matrix layer BM onto the opposite substrate 100 and an orthographic projection of a display area of the sub-pixels onto the opposite substrate 100 do not have an overlapping area, as shown in FIG. 2B.

(2) The red color resistance structure is formed on the opposite substrate 100, on which the black matrix layer BM is formed, by using a patterning process. An orthographic projection of the red color resistance structure onto the opposite substrate 100 covers an orthographic projection of an display area of red sub-pixels onto the opposite substrate 100, and the orthographic projection of the red color resistance structure onto the opposite substrate 100 does not overlap with an orthographic projection of a display area of green sub-pixels and blue sub-pixels onto the opposite substrate 100, as shown in FIG. 2B.

(3) The green color resistance structure is formed on the opposite substrate 100, on which the black matrix layer BM is formed, by using a patterning process. An orthographic projection of the green color resistance structure onto the opposite substrate 100 covers an orthographic projection of the display area of the green sub-pixels onto the opposite substrate 100, and the orthographic projection of the green color resistance structure onto the opposite substrate 100 does not overlap with the orthographic projection of the display area of the red sub-pixels and the blue sub-pixels onto the opposite substrate 100, as shown in FIG. 2B.

(4) The blue color resistance structure is formed on the opposite substrate 100, on which the black matrix layer BM is formed, by using a patterning process. An orthographic projection of the blue color resistance structure onto the opposite substrate 100 covers an orthographic projection of the display area of the blue sub-pixels onto the opposite substrate 100, and the orthographic projection of the blue color resistance structure onto the opposite substrate 100 does not overlap with an orthographic projection of the display area of the red sub-pixels and the green sub-pixels onto the opposite substrate 100, as shown in FIG. 2B.

(5) A leveling layer 130 is formed on the opposite substrate 100, as shown in FIG. 2B.

(6) A second support layer 122 is formed on the color resistance structures away from the opposite substrate 100 by using a patterning process. Exemplarily, a plurality of second support layers 122 are formed on the opposite substrate 100 at intervals, and a material of the second support layers 122 may be the same as the material of the spacer in the related art, as shown in FIG. 2B.

(7) A flat layer 111 covering the entire opposite substrate 110 are formed on a side, away from the opposite substrate 100, of the second support layer 122. Exemplarily, a material of the flat layer 111 may be a resin material, as shown in FIG. 2B.

Figure 4:
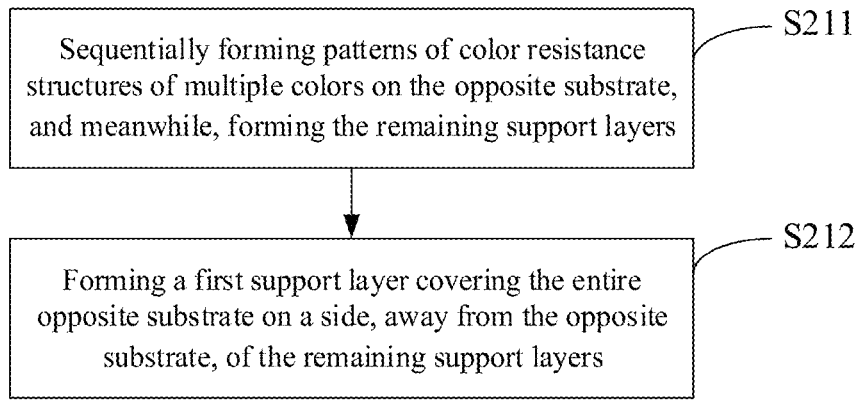
FIG. 4 is another flow chart illustrating a preparing method for a color film substrate provided by an embodiment of the present disclosure.

In further examples, in specific implementation, forming the color resistance layer and the plurality of support structures 110 on the opposing substrate 100, as shown in FIG. 4, may specifically include the following steps.

S211, patterns of color resistance structures of multiple colors are sequentially formed on the opposite substrate 100, and meanwhile, remaining support layers are formed.

S212, a flat layer 111 covering the entire opposite substrate 110 are formed on a side, away from the opposite substrate 100, of the remaining support layers.

The preparing method described above is described below in conjunction with specific embodiments, taking as examples that the color resistance structures include the red color resistance structure, the green color resistance structure and the blue color resistance structure.

Some other preparing methods of the color film substrate provided by the embodiments of the present disclosure may include the following steps.

(1) A pattern of the black matrix layer BM is formed on the opposite substrate 100 by using a patterning process. An orthographic projection of the black matrix layer BM onto the opposite substrate 100 and an orthographic projection of gaps between sub-pixels onto the opposite substrate 100 have an overlapping area, and the orthographic projection of the black matrix layer BM onto the opposite substrate 100 and an orthographic projection of a display area of the sub-pixels onto the substrate 100 do not have an overlapping area, as shown in FIG. 2D.

(2) The red color resistance structure is formed on the opposite substrate 100, on which the black matrix layer BM is formed, by using a patterning process, and meanwhile, a pattern of a fifth support layer 125 is formed. An orthographic projection of the red color resistance structure onto the opposite substrate 100 covers an orthographic projection of a display area of red sub-pixels onto the opposite substrate 100, and the orthographic projection of the red color resistance structure onto the opposite substrate 100 does not overlap with an orthographic projection of a display area of green sub-pixels and blue sub-pixels onto the opposite substrate 100, as shown in FIG. 2D.

(3) The green color resistance structure is formed on the opposite substrate 100, on which the black matrix layer BM is formed, by using a patterning process, and a pattern of a sixth support layer 126 is formed on a fourth support layer. An orthographic projection of the green color resistance structure onto the opposite substrate 100 covers an orthographic projection of a display area of the green sub-pixels onto the opposite substrate 100, and the orthographic projection of the green color resistance structure onto the opposite substrate 100 does not overlap with the orthographic projection of the display area of the red sub-pixels and the blue sub-pixels onto the opposite substrate 100, as shown in FIG. 2D.

(4) The blue color resistance structure is formed on the opposite substrate 100, on which the black matrix layer BM is formed, by using a patterning process, and a pattern of a seventh support layer 127 is formed on the sixth support layer 126. An orthographic projection of the blue color resistance structure onto the opposite substrate 100 covers the orthographic projection of the display area of the blue sub-pixels onto the opposite substrate 100, and the orthographic projection of the blue color resistance structure onto the opposite substrate 100 does not overlap with the orthographic projection of the display area of the red sub-pixels and the green sub-pixels onto the opposite substrate 100, as shown in FIG. 2D.

(5) A flat layer 111 covering the entire opposite substrate 110 is formed on a side, away from the opposite substrate 100, of the seventh support layer. Exemplarily, the material of the flat layer 111 may be a resin material, as shown in FIG. 2D.

It should be noted that processes related to the preparing method for the array substrate provided by the embodiment of the present disclosure may be substantially the same as those described in the related art and are not repeated herein.

After the color film substrate and the array substrate are prepared, the color film substrate and the array substrate are aligned by using an alignment process. Encapsulating into a liquid crystal layer after alignment is applied to form the display panel.

Based on the same disclosed concept, an embodiment of the present disclosure also provides a display device including the above-described display panel provided by the embodiment of the present disclosure. The principle of solving the problem of the display device is similar to the principle of solving the problem of the color film substrate described above, thus the display device can be implemented with reference to implementation of the aforementioned color film substrate, and is not repeated herein.

In some examples, the display device may be: a mobile phone, a tablet, a television, a display, a laptop, a digital photo frame, a navigator, and any product or component having a display function. Other essential components of the display device will be understood by those of ordinary skill in the art and will not be described herein and should not be taken as a limitation on the present disclosure.

While the preferred embodiments of the present disclosure have been described, further variations and modifications may be performed therein on the embodiments by those skilled in the art once the basic inventive concepts have come to mind. Therefore, the attached claims are intended to be construed to include the preferred embodiments and all variations and modifications falling within the scope of the disclosure.

It will be apparent that those skilled in the art can perform various modifications and variations on the embodiments of the present disclosure without departing from the spirit and scope of the embodiments of the present disclosure. Thus, it is intended that the present disclosure includes the modifications and variations of the embodiments of the present disclosure provided which come within the scope of the claims of the present disclosure and their equivalents.

What is claimed is:

1. A display panel, comprising:
a color film substrate; and
an array substrate opposite to the color film substrate;
wherein the color film substrate comprises:
an opposite substrate;
a color resistance layer arranged on the opposite substrate;
a plurality of support structures on a side, away from the opposite substrate, of the color resistance layer at intervals; and
a leveling layer between the color resistance layer and the layer on which the support structures is located; and
the array substrate comprises:
a base substrate; and
a plurality of auxiliary structures on a side, facing the opposite substrate, of the base substrate at intervals;
wherein at least one auxiliary structure of the plurality of auxiliary structures correspondingly contacts with at least one support structure of the plurality of support structures;
wherein each of the plurality of support structures comprises: at least two support layers stacked, the at least two support layers comprise a flat layer away from a side of the opposite substrate, the flat layer covers at least one remaining support layer of the at least two support layers, a slope angle of the flat layer in the support structure is greater than a slope angle of the at least one remaining support layer, and the slope angle is an angle between a plane at which the leveling layer is located and a side surface of the at least one remaining support layer;
wherein a material of the flat layer is a resin material; and a material of at least one remaining support layer is the same as a material of a color resistance structure of one color of the color resistance structures of multiple colors.

2. The display panel according to claim 1, wherein an orthographic projection of the flat layer onto the opposite substrate covers the opposite substrate.

3. The display panel according to claim 1, wherein the color resistance layer comprises color resistance structures of multiple colors.

4. The display panel according to claim 3, wherein a quantity of layers of in the at least one remaining support layers is less than or equal to a quantity of colors of the color resistance structures of multiple colors.

5. The display panel according to claim 4, wherein the color resistance structures comprise a red color resistance structure, a green color resistance structure, and a blue color resistance structure; and
the at least one remaining support layers comprises a support layer of the same material as the red color resistance structure, a support layer of the same material as the green color resistance structure, and a support layer of the same material as the blue color resistance structure.

6. The display panel according to claim 4, wherein the at least one remaining support layer is arranged as two or three or more than three support layers.

7. The display panel according to claim 1, wherein the color film substrate further comprises: a black matrix layer between the opposite substrate and the color resistance layer; and
an orthographic projection of the black matrix layer onto the opposite substrate covers an orthographic projection of the plurality of support structures onto the opposite substrate.

8. The display panel according to claim 7, wherein an orthogonal projection of the at least one auxiliary structure is intersected with an orthogonal projection of the at least one support structure correspondingly contacting with the at least one auxiliary structures onto the base substrate.

9. The display panel according to claim 8, wherein the orthogonal projection of the auxiliary structure onto the base substrate and the orthogonal projection of the support structure correspondingly contacting with the auxiliary structure onto the base substrate are in a cross shape.

10. A display device, comprising the display panel according to claim 1.

11. The display panel according to claim 1, wherein the at least one remaining support layer is one support layer.

* * * * *